(No Model.)

A. W. MILES & E. A. COMMANDER.
NUT LOCK.

No. 509,602. Patented Nov. 28, 1893.

Witnesses:
L. C. Hills
E. H. Bond

Inventors:
Arthur W. Miles and
Edward A. Commander
By E. B. Stocking
Attorney

UNITED STATES PATENT OFFICE.

ARTHUR W. MILES AND EDWARD A. COMMANDER, OF LIVINGSTON, MONTANA.

NUT-LOCK.

SPECIFICATION forming part of Letters Patent No. 509,602, dated November 28, 1893.

Application filed July 29, 1893. Serial No. 481,326. (No model.)

*To all whom it may concern:*

Be it known that we, ARTHUR W. MILES and EDWARD A. COMMANDER, citizens of the United States, residing at Livingston, in the county of Park, State of Montana, have invented certain new and useful Improvements in Nut-Locks, of which the following is a specification, reference being had therein to the accompanying drawings.

This invention relates to certain new and useful improvements in nut locks or washers therefor, and it has for its object among others to provide a simple and cheap nut lock which can be manufactured at small cost, and by a single stroke.

It comprises two parts, one of rigid material and the other of a bendable metal, the two united by the formation of the ribs or prongs which are stamped or formed from the materials, forming slots where the said prongs are separated.

Other objects and advantages of the invention will hereinafter appear and the novel features thereof will be specifically defined by the appended claims.

The invention is clearly illustrated in the accompanying drawings, which, with the letters of reference marked thereon, form a part of this specification and in which—

Figure 1:
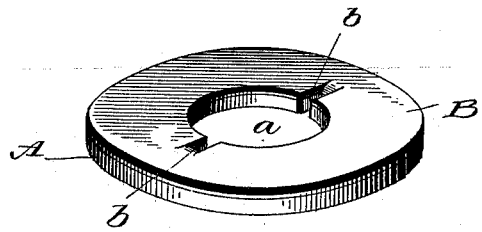
Figure 2:
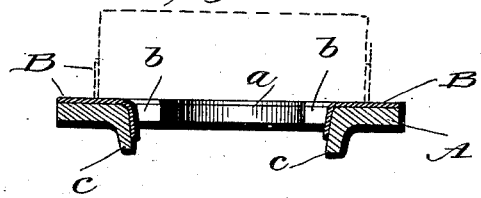
Figure 3:
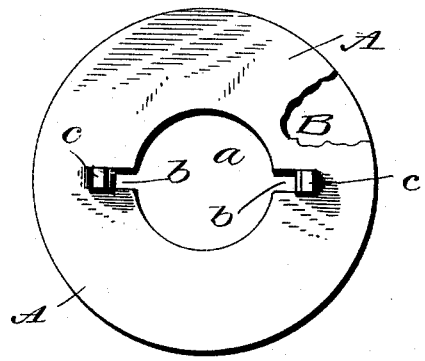

Figure 1 is a perspective view of our improved washer. Fig. 2 is a central cross section through the same. Fig. 3 is a bottom plan.

Like letters of reference indicate like parts throughout the several views.

In carrying out our invention we take a piece of rigid material A and place upon it a piece of bendable metal B and then by suitable means as a die or stamp we give the same the desired shape, preferably circular or substantially so, as shown, and this die or stamp is formed to not only give to the washer the desired shape but at the same time to form the bolt opening $a$ and the diametrically-opposite slots $b$, the metal which is separated from the body portions of the parts A and B being forced out at substantially a right angle to the face of the washer to form the prongs or ribs $c$ and this forming of the prongs or ribs serves also to bind or hold the two parts A and B together; they may be further held together in any convenient manner, if desired. The forcing of the metal to form the ribs into the slots will ordinarily be found sufficient to retain the two parts in their relative positions.

In practice, the washer is placed upon the bolt with the prongs or ribs against the part to be held and after the nut has been screwed up the bendable part B is turned up against the side or sides of the nut as indicated by dotted lines in Fig. 2. The part B being free and disconnected from the part A around its entire periphery, it can be turned up at any portion against the side or sides of the nut as will be understood. The prongs or ribs $c$ are forced into the beam or other object through which the bolt passes and hold the washer in position.

What we claim as new is—

1. A nut-lock or washer formed of two parts one rigid and the other of bendable metal, with diametrically opposite slots through the two parts from the bolt opening toward the outer edge and prongs extending from the slots, as set forth.

2. A nut-lock or washer composed of two parts, one rigid and the other of bendable metal with diametrically-opposite slots through the two parts from the bolt opening toward the periphery, and prongs formed of the two parts extending at substantially a right angle to the body portion in said slots, substantially as shown and described.

In testimony whereof we affix our signatures in presence of two witnesses.

ARTHUR W. MILES.
EDWARD A. COMMANDER.

Witnesses:
H. J. MILES,
J. H. WOLCOTT.